United States Patent
Phaal

(10) Patent No.: US 6,446,222 B1
(45) Date of Patent: Sep. 3, 2002

(54) SYSTEM FOR AND METHOD OF SENDING NETWORK PROBLEM INFORMATION ALONG A COMMUNICATION PATH

(75) Inventor: Peter Phaal, San Francisco, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/256,033

(22) Filed: Feb. 23, 1999

(51) Int. Cl.[7] .............................................. G06F 11/00
(52) U.S. Cl. ............................................. 714/43; 714/4
(58) Field of Search ............................. 714/43, 4, 716

(56) References Cited

U.S. PATENT DOCUMENTS

| | | | | |
|---|---|---|---|---|
| 5,701,305 A | * | 12/1997 | Albrecht | 714/712 |
| 5,715,393 A | * | 2/1998 | Naugle | 709/224 |
| 5,862,145 A | * | 1/1999 | Grossman | 714/704 |
| 5,898,826 A | * | 4/1999 | Pierce | 714/4 |
| 5,907,670 A | * | 5/1999 | Lee | 714/4 |
| 5,909,549 A | * | 6/1999 | Compliment | 709/223 |
| 5,935,215 A | * | 8/1999 | Bell | 709/239 |
| 5,978,936 A | * | 11/1999 | Chandra | 714/43 |
| 6,173,312 B1 | * | 1/2001 | Atarashi | 709/203 |
| 6,199,172 B1 | * | 3/2001 | Dube | 714/4 |
| H1964 H | * | 6/2001 | Hoffpauir | 370/419 |
| 6,269,082 B1 | * | 7/2001 | Mawhinney | 370/247 |

OTHER PUBLICATIONS

W. Richard Stevens TCP/IP illustrated vol. 1: The Protocols pp. 85–96 copyright 1994.*

* cited by examiner

Primary Examiner—Robert Beausoliel
Assistant Examiner—Bryce P. Bonzo

(57) ABSTRACT

A system for and method of sending network problem information along a communication path of a network having an unknown configuration and inaccessible components including a first device for observing network problems and a second device for relieving network problems. Upon observation of a problem, the first device generates and sends an enhanced loopback test message to the source of the problem. The enhanced loopback test contains information regarding the source and the nature of the problem. The second device, being along the path of the loop between the first device and the source, receives the problem information and responds by reducing the problem as appropriate.

14 Claims, 1 Drawing Sheet

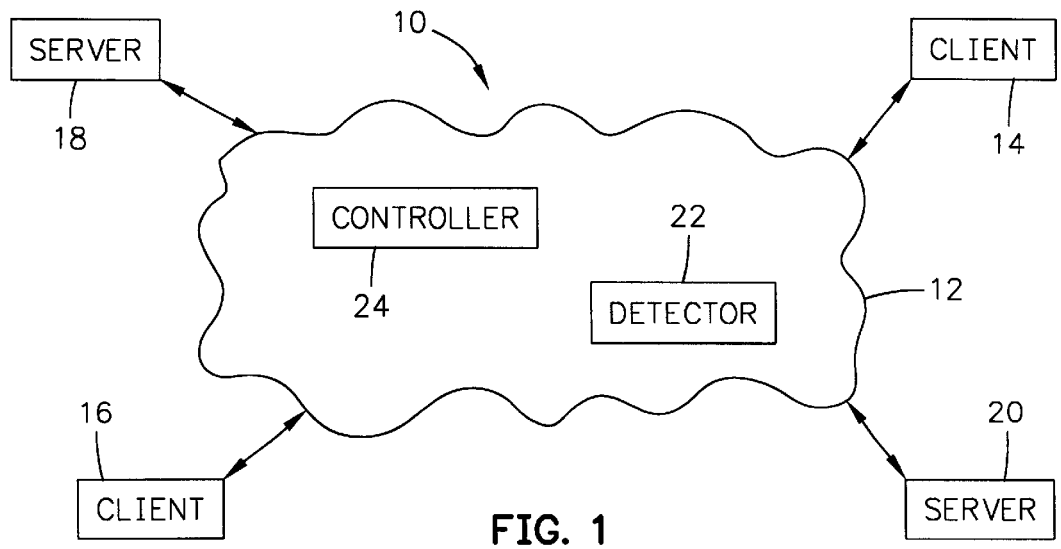
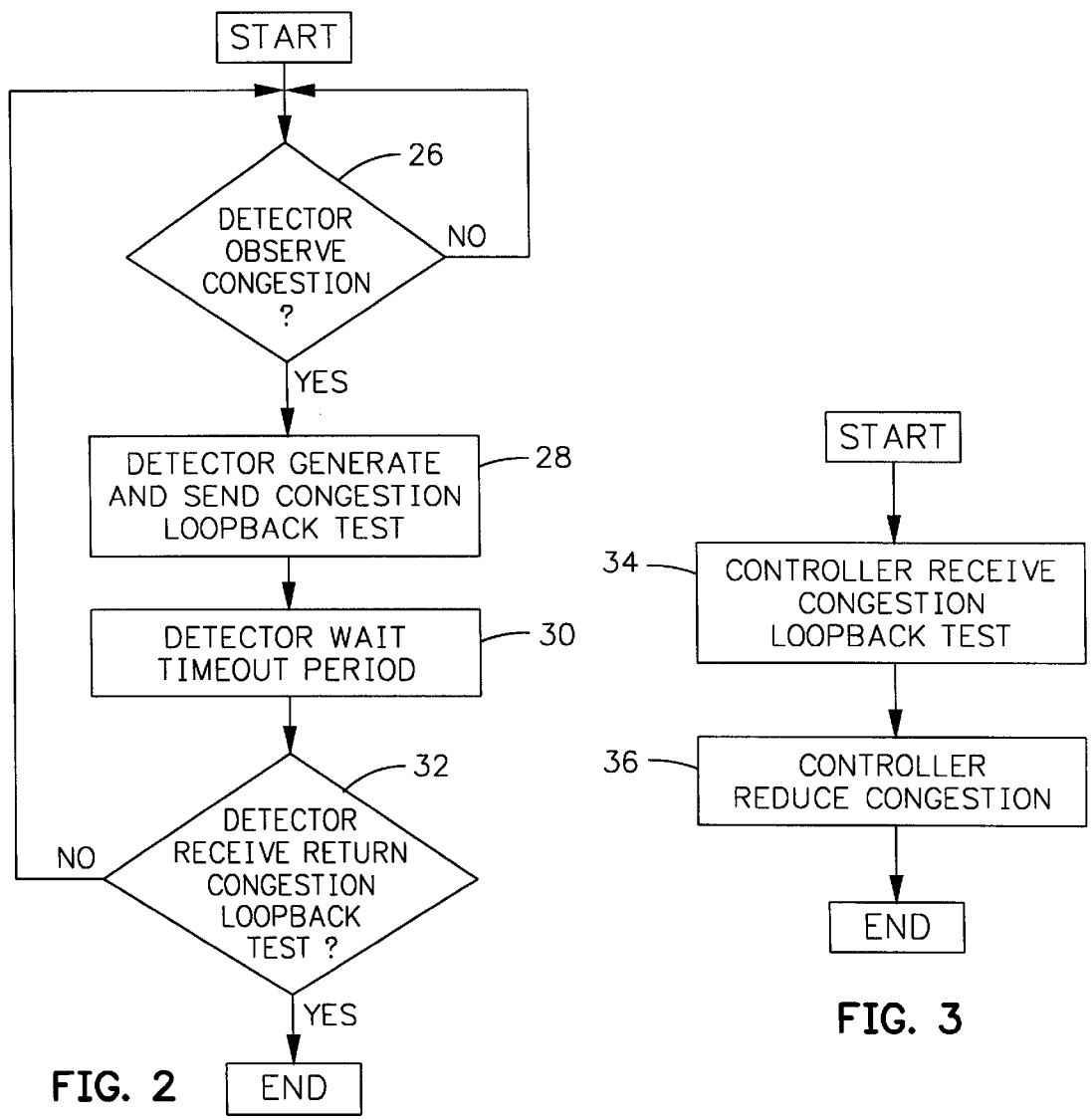

SYSTEM FOR AND METHOD OF SENDING NETWORK PROBLEM INFORMATION ALONG A COMMUNICATION PATH

BACKGROUND OF THE INVENTION

1. Field of Invention

The present invention relates generally to the field of networks and pertains more particularly to a system for and method of sending network problem information along a communication path of a network having an unknown configuration and inaccessible components to reduce network problems.

2. Discussion of the Prior Art

Since at least as early as the invention of the first computer system, people have endeavored to link computers together. Linking computers together in a network allows direct communication between the various points of the network and sharing of resources among the points of the network. This was especially desirable early on because computers were very large and very expensive. Today, computers are far more prevalent, but the desire to link them together is still strong. This is most readily demonstrated by the explosive growth of the Internet.

Servers are commonly employed for sharing of information among large numbers of computer systems or similar devices. A computer system or similar device that communicates with a server is usually referred to as a client of the server and the server is often part of a host system. A client and a host typically exchange messages via a communication network using a predetermined protocol. Such protocols are usually arranged in a client/host model in which a requesting client transfers a request message to a host and the host in turn takes an appropriate action depending on the content of the request. Typically, the appropriate action for the request includes the transfer of a response message to the requesting client.

In an effort to conserve resources, networks are designed such that they do not generally consist of dedicated paths from every point in the network to every other point in the network. Rather, source points are connected to central switching points where messages are routed to the appropriate destination points. Although reducing the resources needed, switched networks do require monitoring and regulation to assure fair sharing of the network resources. Many problems may arise with the network that impact on the fair sharing of the resources. One problem, for example, that networks can suffer from is congestion. Monitoring of a network is performed by a detector which examines the messages that pass through it to spot signs of congestion. Congestion may result from a client who is generating too many messages, a switching point which is overloaded, or a server which is processing too few messages. One of ordinary skill in the art will realize that other signs and forms of congestion also exist. Regulation of a network is performed by a controller which acts to reduce congestion. The controller may routinely be an active participant in the handling of messages in the network or the controller may only monitor network traffic without handling the communication of messages. To reduce congestion, the controller may act alone, may act in concert with another device, or may direct another device to act on behalf of the controller. Congestion may be reduced by restricting the number of messages accepted from a client, routing messages through another switching point, or restricting the number of messages transmitted to a server. One of ordinary skill in the art will realize that other ways of reducing congestion also exist.

Traditionally, in order for network monitoring and regulation to be totally effective, knowledge of and control over all of the points in the network is necessary. This is not a problem if the network is owned by a single entity. However, if the network includes points along a path that are owned by more than one entity, then these requirements are missing and effective monitoring and regulation are severely limited. For example, even though a detector may recognize that the network is congested, the detector does not know how to inform the appropriate controller to relieve the congestion and the controller does not realize that there is a problem that it could address. This is especially the case for the Internet where multiple entities are involved including client web browsers, internet service providers, and web servers. The Internet is a patchwork of privately and publicly owned sub-networks without any centralized administration. Each of the sub-networks carries its own traffic, sends traffic to other sub-networks, receives traffic from other sub-networks, and may act as a relay to traffic that is just passing through. When congestion occurs there is a problem of knowing who to inform in order to reduce or eliminate the traffic at its source. Ideally, any excess traffic to a congested web site would be stopped before it even entered the network.

A definite need exists for a system having an ability to alleviate problems in a network having an unknown configuration and inaccessible components. In particular, a need exists for a system which is capable of sending network problem information along a communication path. Ideally, such a system would operate by observing a network problem and relieving it. With a system of this type, problem information would provide a reliable means of fairly sharing network resources. A primary purpose of the present invention is to solve this need and provide further, related advantages.

SUMMARY OF THE INVENTION

A system for and method of sending network problem information along a communication path of a network having an unknown configuration and inaccessible components is disclosed including a first device for observing network problems and a second device for relieving network problems. Upon observation of a problem, the first device generates and sends an enhanced loopback test message to the source of the problem. The enhanced loopback test contains information regarding the source and the nature of the problem. The second device, being along the path of the loop between the first device and the source, receives the problem information and responds by reducing the problem as appropriate.

BRIEF DESCRIPTION OF THE DRAWING

The above and other objects and advantages of the present invention will be more readily appreciated from the following detailed description when read in conjunction with the accompanying drawing, wherein:

FIG. 1 is a block diagram of a system for sending network problem information along a communication path of a network having an unknown configuration and inaccessible components to reduce the problem of congestion;

FIG. 2 is a flow diagram of the processing of congestion information by the detector in one embodiment of the present invention; and FIG. 3 is a flow diagram of the processing of congestion information by the controller in one embodiment of the present invention.

DETAILED DESCRIPTION OF THE PREFERRED EMBODIMENTS

A purpose of the present invention is to provide a reliable means of fairly sharing network resources. Turning first to FIG. 1, a block diagram of a system for sending network problem information along a communication path of a network having an unknown configuration and inaccessible components to reduce the problem of congestion is shown. Congestion is presented as one example of the problems that can be addressed by the present invention. The system 10 includes a plurality of clients 14, 16 and a plurality of servers 18, 20. For example, if the system 10 were the worldwide-web, then the clients 14, 16 would be web browsers and the servers 18, 20 would be web servers hosting web sites.

The network 12 includes at least one detector 22 and at least one controller 24. One of ordinary skill in the art will recognize that the network 12 also includes a wide variety of other network devices (not shown) which utilize the network, enable the network to operate, or both. The network 12 operates based on any one of a number of available protocols including the Internet Protocol (IP), the User Datagram Protocol (UDP), the Simple Mail Transfer Protocol (SMTP), and the Hypertext Transfer Protocol (HTTP), as well as the Network File System (NFS) Protocol. These and other commonly used protocols support what is known as a loopback or "ping" test.

The loopback test is a simple way for one device to check on the status of another device and, indirectly, on the path between the two devices. When the first device wants to determine if the second device is present and active, the first device will ping the second device. The first device or source generates a loopback test message and sends it to the second device or destination. If the second device is present and active, then it will simply reverse the order of the source and the destination on the loopback test and return it. If the first device receives the return loopback test, then it knows that the second device is present and active. If the first device does not receive the return loopback test, then either the second device is not present and active or the message was lost during transmission. Either way, effective communication is not possible until the loopback test succeeds. The other network devices along the path of the loop between the first device and the second device simply pass the message along from source to destination as per their protocol. Although a path is not officially dedicated between the first device and the second device, messages often follow the same path through the network from one device to the other and back. Any device in the system can check on the status of any other device in the system so long as the first device knows of the existence of the second device.

For example, assume that client 14 wants to check on the status of server 18. Client 14 generates a loopback test, addresses it to server 18, and sends it over the network 12. The path through the network is not fully known. However, assume further that the path includes both the detector 22 and the controller 24, in that order, from client 14 to server 18. If so, later, the detector 22 will receive the loopback test and pass it on. Later still, the controller 24 will receive the loopback test and pass it on. Eventually, server 18 will receive the loopback test, reverse the order of the source and the destination, and return it. Later, the controller 24 will receive the return loopback test and pass it on. Later still, the detector 22 will receive the return loopback test and pass it on. If the test is successful, finally, client 14 will receive the return loopback test and know that server 18 is present and active.

Recall from above that traditionally, in order for network monitoring and regulation to be totally effective, knowledge of and control over all of the points in the network are necessary and that, if the network includes points along a path that are owned by more than one entity, then effective monitoring and regulation are severely limited. The present invention expands the functionality of the detector 22 and the controller 24 through the use of a congestion loopback test to establish more effective monitoring and control to relieve congestion.

A congestion loopback test is a conventional loopback test that also contains congestion information. The source of the congestion loopback test is always a detector. The destination of the congestion loopback test is always the source of the congestion. Consequently, the congestion loopback test must be designed so as not to significantly add to the congestion. Similar to a conventional loopback test, the destination receives the congestion loopback test, reverses the order of the source and the destination, and returns it. Also, except for controllers, the other network devices along the path of the loop between the detector and the destination simply pass the message along. Unlike the conventional loopback test, the controllers along the path of the loop do more than pass the message along. In addition, the controllers extract a copy of the congestion information, determine whether they can do anything to relieve the congestion, and act to relieve congestion whenever and however possible.

Turning now to FIG. 2, a flow diagram of the processing of congestion information by the detector 22 in one embodiment of the present invention is shown. The process begins at START. At decision block 26, the detector 22 of FIG. 1 monitors network traffic that passes through it for signs of congestion. When the detector observes congestion, processing proceeds to block 28 where the detector generates a congestion loopback test and sends it out. At block 30, the detector waits for a predetermined timeout period. The timeout period should be at least as long as it takes for the congestion loopback test to traverse the path, be reversed by the destination, and to re-traverse the path. At decision block 32, the detector determines if it has received the return congestion loopback test during the timeout period. If the return congestion loopback test has not been received, the congestion problem has probably not been relieved and processing returns to decision block 26 for further attempts to relieve congestion. If the return congestion loopback test has been received, the congestion problem has probably been relieved and processing ends.

Turning now to FIG. 3, a flow diagram of the processing of congestion information by the controller 24 in one embodiment of the present invention is shown. The process begins at START. At block 34, the controller 24 of FIG. 1 receives the congestion loopback test and extracts a copy of the congestion information. At block 36, the controller acts to reduce congestion whenever and however possible. The processing of FIG. 3 will typically occur during block 30 of FIG. 2. At the very least, block 34 will occur during the timeout period. Block 36 may occur after or take longer than the timeout period depending on the circumstances. If there are multiple controllers along the path of the loop from the detector to the destination and back, blocks 34 and 36 will be repeated with each controller on the path as necessary.

For example, assume that the system 10 of FIG. 1 is the world-wide-web, the clients 14, 16 are web browsers, and the servers 18, 20 are web servers hosting web sites. Assume further that web server 20 has become overloaded with web page requests that have resulted in congestion on the network 12. At block 26 of FIG. 2, the detector observes the congestion caused by web server 20. At block 28, the detector generates a congestion loopback test containing information that web server 20 is causing congestion and sends it out to web server 20. At block 30, the detector waits for the predetermined timeout period to expire. Assume further that the controller 24 is on the path between the detector 22 and web server 20. During the timeout period, at block 34 of FIG. 3, the controller receives the congestion loopback test and extracts a copy of the congestion information about web server 20. At block 36, the controller acts to reduce congestion by restricting the number of messages transmitted to web server 20. Assume further still that the congestion loopback message returns to the detector during the timeout period. At block 32 of FIG. 2, the detector determines that it has received the return congestion loopback test after having traversed the path, having been reversed by web server 20, and having re-traversed the path.

Through the operation of the congestion loopback test of the present invention, a detector 22 that observes congestion can alert a controller 24 that the detector does not even know exists that a problem has developed. The controller can then act to relieve the problem that it did not even know had developed. Consequently, the detector and controller can act together even though they are located at different sites and owned by different entities.

One of ordinary skill in the art will realize that the concepts disclosed here in the context of the problem of congestion could be applied to any number of network problems or concerns. One only has to change the details of the information contained in the enhanced loopback test to address the specific problem or concern. Depending on the situation, the source of and the actor on the information may also change. In any case, the basic system for and method of sending network problem information along a communication path of a network having an unknown configuration and inaccessible components would be the same. A first device would detect the problem, generate an enhanced loopback test containing information about the problem, and send the message out. A second device would receive the enhanced loopback test and extract a copy of the problem information. The second device then would act to abate the problem whenever and however possible. Consequently, two devices can act together to relieve network problems even though they are located at different sites and owned by different entities. In essence, the devices can think globally and act locally.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A system for sending network problem information along a communication path of a network having an unknown configuration and inaccessible components, the system comprising:
   a first network device configured to detect a network problem, generate an enhanced loopback test containing information about the problem, send the enhanced loopback test out over the network, wait a predetermined timeout period, and receive the return enhanced loopback test; and
   a second device configured to receive the enhanced loopback test from the network, extract the problem information from the enhanced loopback test, and take action to abate the problem,
   wherein the problem is congestion, the first device is a detector of congestion, the enhanced loopback test is a congestion loopback test, and the second device is a controller of congestion.

2. The system according to claim 1, wherein the first device is located at a first location and the second device is located at a second location that is different from the first location.

3. The system according to claim 1, further comprising a plurality of detectors and a plurality of controllers.

4. A problem detector for s system for sending network problem information along a communication path of a network having an unknown configuration an inaccessible components, the detector comprising:
   means for detecting a network problem:
   means for generating an enhanced loopback test containing information about the problem;
   means for sending the enganced loopback test out over the network;
   means for waiting for a predetermined timeout period to expire; and
   waiting for a predetermined timeout period to expire; and
   receiving the return enhanced loopback test.

5. A problem detector for a system for sending network problem information along a communication path of a network having an unknown configuration and inaccessible components, the detector comprising:
   means for receiving an enhanced loopback test from the network;
   means for extracting problem information from the enhanced loopback test; and
   means for taking action to abate the problem;
   wherein the problem is congestion and the enhanced loopback test is a congestion loopback is a congestion loopback test.

6. A system for sending network problem information along a communication path of a network having an unknown configuration and inaccessible components, the system comprising:
   means, in a first network device, for detecting a network problem by monitoring a loopback test sent from a second network device to a third network device;
   means for generating an enhanced loopback test containing information about the problem;
   means for sending the enhanced loopback test out over the network;
   means for waiting a predetermined timeout period to expire; and
   means for receiving the return enhanced loopback test.

7. The system according to claim 6, further comprising:
   means for receiving the enhanced loopback test from the network;
   means for extracting the problem information from the enhanced loopback test; and
   means for taking action to abate the problem.

8. A system for sending network problem information along a communication path of a network having an unknown configuration and inaccessible components, the system comprising:
   means for detecting a network problem;
   means for generating an enhanced loopback test containing information about the problem;
   means for sending the enhanced loopback test out over the network;

means for waiting a predetermined timeout period to expire;

means for receiving the return enhanced loopback test;

means for receiving the enhanced loopback test from the network;

means for extracting the problem information from the enhanced loopback test; and means for taking action to abate the problem;

wherein the problem is congestion and the enhanced loopback test is a congestion loopback test.

9. A method of problem detection for sending network problem information along a communication path of a network having an unknown configuration and inaccessible components, the method comprising the steps of:

detecting, in a first network device, a network problem by monitoring a loopback test sent from a second network device to a third network device;

generating an enhanced loopback test containing information about the problem;

sending the enhanced loopback test out over the network;

waiting for a predetermined timeout period to expire; and receiving the return enhanced loopback test.

10. A method of problem detection for sending network problem information along a communication path of a network having an unknown configuration and inaccessible components, the method comprising the steps of:

detecting a network problem;

generating an enhanced loopback test containing information about the problem;

sending the enhanced loopback test out over the network;

waiting for a predetermined timeout period to expire; and receiving the return enhanced loopback test;

wherein the problem is congestion and the enhanced loopback test is a congestion loopback test.

11. A method of problem controlling for utilizing network problem information sent along a communication path of a network having an unknown configuration and inaccessible components, the method comprising the steps of:

receiving an enhanced loopback test from the network;

extracting problem information from the enhanced loopback test; and taking action to abate the problem;

wherein the problem is congestion and the enhanced loopback test is a congestion loopback test.

12. A method of sending network problem information along a communication path of a network having an unknown configuration and inaccessible components, the method comprising the steps of:

detecting, in a first network device, a network problem by monitoring a loopback test sent from a second network device to a third network device;

generating an enhanced loopback test containing information about the problem;

sending the enhanced loopback test out over the network;

waiting for a predetermined timeout period to expire; and receiving the return enhanced loopback test.

13. The method according to claim 12, further comprising the steps of:

receiving the enhanced loopback test from the network;

extracting the problem information from the enhanced loopback test; and taking action to abate the problem.

14. The method according to claim 13, wherein the problem is congestion and the enhanced loopback test is a congestion loopback test.

* * * * *